United States Patent
Tennler

(10) Patent No.: US 9,677,787 B2
(45) Date of Patent: Jun. 13, 2017

(54) LIQUID-BASED ADJUSTING DEVICE FOR A SOLAR SYSTEM

(71) Applicant: Claus Tennler, Nürnberg (DE)

(72) Inventor: Claus Tennler, Nürnberg (DE)

( * ) Notice: Subject to any disclaimer, the term of this patent is extended or adjusted under 35 U.S.C. 154(b) by 247 days.

(21) Appl. No.: 14/611,455

(22) Filed: Feb. 2, 2015

(65) Prior Publication Data
US 2015/0226462 A1   Aug. 13, 2015

(30) Foreign Application Priority Data
Feb. 11, 2014   (DE) .......................... 10 2014 001 743

(51) Int. Cl.
| | | |
|---|---|---|
| *F24J 2/54* | (2006.01) | |
| *F24J 2/38* | (2014.01) | |
| *F24J 2/52* | (2006.01) | |

(52) U.S. Cl.
CPC .............. *F24J 2/38* (2013.01); *F24J 2/5431* (2013.01); *F24J 2/5267* (2013.01); *Y02E 10/47* (2013.01)

(58) Field of Classification Search
CPC .................. F24J 2/54; F24J 2/38; G01F 23/30
USPC .................. 126/608, 425; 250/203 R, 203 S; 136/246
See application file for complete search history.

(56) References Cited

U.S. PATENT DOCUMENTS

| | | | | |
|---|---|---|---|---|
| 4,786,795 A * | 11/1988 | Kurashima | ................ | F24J 2/38 126/573 |
| 5,600,124 A * | 2/1997 | Berger | ................ | F24J 2/38 126/573 |
| 8,569,616 B2 * | 10/2013 | Guha | ................ | F24J 2/067 136/256 |
| 2014/0208746 A1 * | 7/2014 | Yeomans | ................ | F24J 2/42 60/641.15 |
| 2014/0366929 A1 * | 12/2014 | Blau | ................ | H02S 20/32 136/246 |

(Continued)

FOREIGN PATENT DOCUMENTS

| | | | |
|---|---|---|---|
| DE | 27 55 722 A1 | 6/1979 | |
| DE | 2755722 A * | 6/1979 | ................ F24J 3/02 |

(Continued)

OTHER PUBLICATIONS

DE 102008050250 A1 Solar Plant, Apr. 2010 by Kadi S.*

*Primary Examiner* — Gregory Huson
*Assistant Examiner* — Nikhil Mashruwala
(74) *Attorney, Agent, or Firm* — Michael J. Gallagher; David J. Dawsey; Gallagher & Dawsey Co., LPA

(57) ABSTRACT

Liquid-based adjusting device (100) for a solar system comprising
at least one holding element (1) for attaching at least one solar element,
a swivel device (2), designed and intended for swiveling the holding element (1) around at least one swivel axis (S) and/or along a guiding curve (F) of the holding element (1), wherein one floating body (1A) of the holding element (1) is at least partially arranged below a filling level (30A) of the liquid tank (3A) and only by the buoyancy thereof the holding element (1) is swivel-mounted relative to one longitudinal axis (L) of the liquid tank (3A) around the swivel axis (S) and/or along the guiding curve (F) and mounted above the filling level (30A) directly on the rim (31A) of the liquid tank (3A), wherein the filling level (30A) of the liquid tank (3A) can be varied by means of a piping system (4) of the swivel device (1).

11 Claims, 3 Drawing Sheets

(56) References Cited

U.S. PATENT DOCUMENTS

Figure 1A:
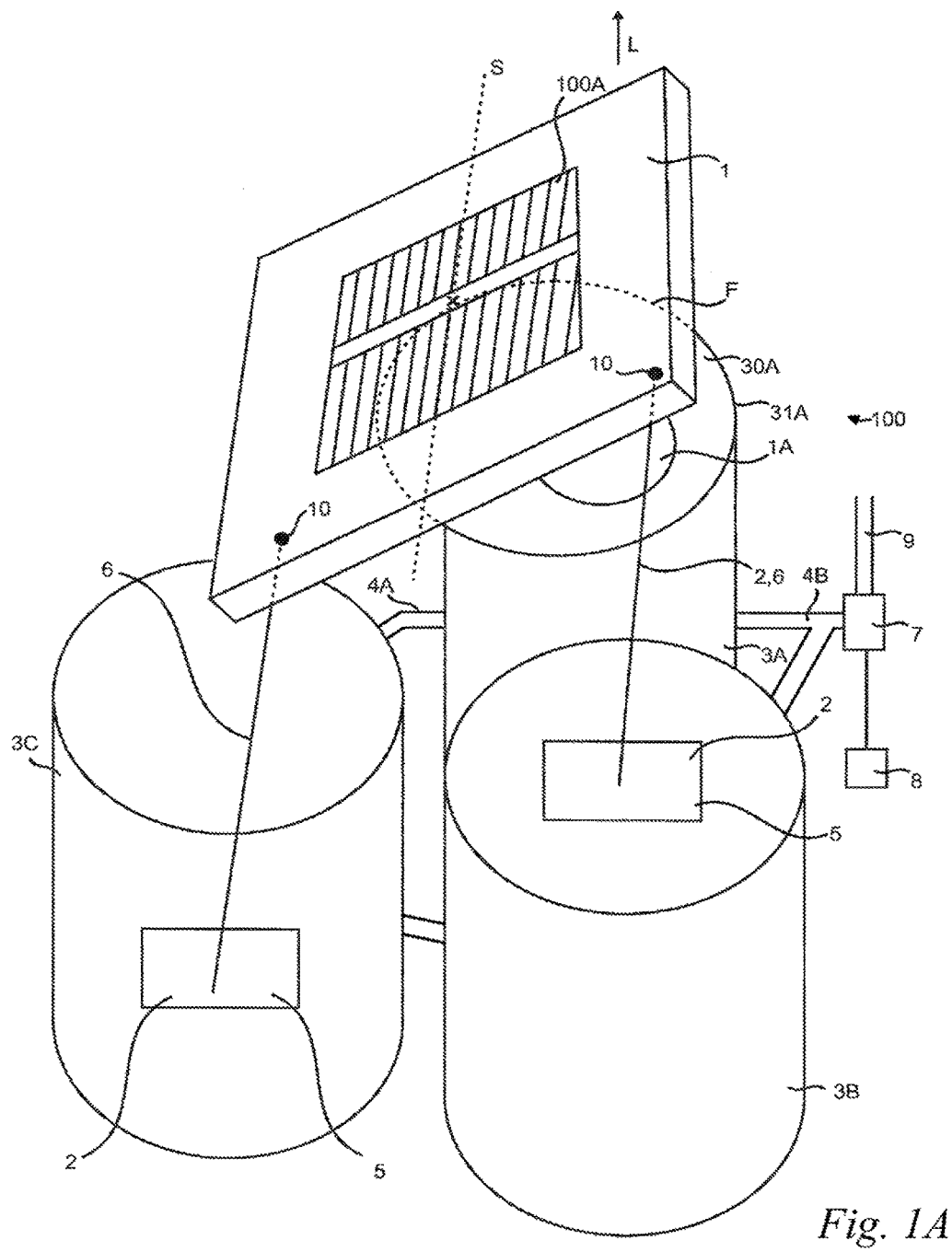

2015/0155827 A1* 6/2015 Yeomans .................. F24J 2/14
136/246

FOREIGN PATENT DOCUMENTS

| DE | 42 40 541 A1 | 7/1993 | | |
|----|----|----|----|----|
| DE | WO 2005028968 | * | 3/2005 | ................ F24J 2/38 |
| DE | 10 2006 019 753 A1 | 10/2007 | | |
| DE | 10 2008 050 250 A1 | 4/2010 | | |
| DE | 102008050250 A1 | * | 4/2010 | ................ F24J 2/54 |

* cited by examiner

LIQUID-BASED ADJUSTING DEVICE FOR A SOLAR SYSTEM

The present invention refers to a liquid-based adjusting device for a solar system in accordance with the preamble of the patent claim 1.

Adjusting devices for solar systems, that allow for the position and arrangement of a solar system, particularly of a solar element of the solar system relative to the position of the sun and/or in relation to, for example, a roof inclination to be adjusted are known according to state-of-the-art technology. In order to adjust the inclination of the adjusting device and thus the inclination of the solar system or solar element respectively relative, for instance, to the position of the sun it is known from the prior art that this adjusting device comprises a holding element for attaching at least one solar element as well as a swivel device that is designed and intended for swiveling the holding element around at least one swiveling axis for example on the roof of a house by means of electromotors.

Electromotors of this type may for example be controlled via a controlling device and thus allow for the holding element, to which a solar element is attached, to be adjusted while keeping the noise as low as possible, however, electromotors such as these show inter alia the disadvantage, that on the one hand they are often quite expensive and also require intensive maintenance and on the other hand they can be liable to breaking down, particularly due to weather conditions. Rain, that is to say moisture, can for example cause a short circuit in the electronic control system of the electromotor.

According to state-of-the-art technology, electromotors such as these often had to be replaced, which further increased costs of the solar system during operation of the adjusting device.

As such, one purpose of the present invention is to offer an alternative swivel mechanism, particularly an alternative swivel device, which allows for the holding element to be moved relative to the position of the sun in a predefined manner for example on a roof while keeping costs at a minimum. Furthermore its purpose is to offer a cost-effective option to operate the entire solar system, and in particular also the swivel device, reliably and especially as independent of the weather conditions as possible.

This purpose is accomplished by the subject matter of the currently valid patent claim 1.

In order to offer a liquid-based adjusting device for a solar system that is reliable as well as inexpensive to produce and operate, the present invention is based inter alia on the idea that the adjusting device comprises at least one liquid tank, wherein a floating body of the holding element is arranged at least partially below a filling level of the liquid tank and only by the buoyancy thereof the holding element is swivel-mounted relative to a longitudinal axis of the liquid tank around the swiveling axis and/or along the guide curve and is mounted above the filling level, at least indirectly on a rim of the liquid tank, wherein the filling level of the liquid tank can be varied in a predefined manner by means of a piping system of the swivel device.

"At least indirectly" means, that in order to swivel and/or rotate the holding element relative to the rim, at least a swivel device, for example comprising at least one swivel joint, is fixated between the holding element and the rim or is movably attached along the rim. If a swivel and/or guiding device such as this are [is] arranged between the holding element and the rim of the liquid tank, the rim and the holding element are only connected indirectly, but not directly.

If an additional swivel device such as this is not used, however, the holding element can be in direct contact with the rim of the liquid tank and touch it directly. The holding element and the rim of the liquid tank are then in direct contact with one another.

In this respect, the term "liquid-based adjusting device" means an adjusting device which uses liquids for adjusting and setting in a direct manner. Therefore, electromotors for direct adjustment can be foregone completely in a favorable manner. In this respect, the present adjusting device can be free of electromotive drives. In doing so, the adjusting device described here can be mounted on roofs as well as in water or onto a vehicle.

In particular, the floating body is mounted to a side of the holding element opposite of the solar element, that is to say to its bottom. The floating body and the solar element are therefore mounted onto surfaces of the holding element opposite each other. In other words, by using an arrangement such as this, a mounting plain onto which the solar element is mounted, will take on an adjustable angle of less than 90° relative to the longitudinal axis of the liquid tank. The smaller the angle between the main extension plain of the holding element and the longitudinal axis of the liquid tank, the stronger an inclination of the holding element and therefore also an inclination of the solar element relative to the longitudinal axis of the liquid tank.

In other words, the floating body extends away from the solar element and exclusively into the liquid tank itself. Thus, the floating body touches the rim of the liquid tank directly on a slant and is supported exclusively by said rim of the liquid tank. In this respect, the rim of the liquid tank preferably forms the guiding curve of the holding element by itself. In particular, the rim can also define, determine and/or form the swivel axis of the holding element as described above. Preferably, the floating body can be rolled off slip-free in peripheral direction of the boundary, i.e. along the rim of the holding element.

Preferably the liquid tank is mounted statically, so that the longitudinal axis of the liquid tank remains unchanged during operation. As an alternative to this, it might also be possible, however, that the liquid tank is capable of being varied in its orientation relative to the holding element and/or to a mounting plain of the liquid tank, for example in relation to the position of the sun. In order to achieve this, a cushion and/or an electromotor and/or a mechanical element of some sort can be attached outside at the bottom of the liquid tank to change the orientation of the liquid tank.

Regarding the piping system it must be said, that in order to vary the filling level of the liquid tank, the piping system comprises at least one liquid lead-in that leads into the liquid tank and one liquid lead-out that leads out of the liquid tank. By using a direct arrangement of the piping system to the liquid tank such as this, the filling level can be varied quickly, easily and without using mechanical and/or electrical elements via a supply and/or removal of liquid.

Regarding the swivel axis it must be said, that it can go along a main extension plain of the rim of the liquid tank and is preferably arranged in it. One swivel point of the holding element is therefore defined as a support point of the floating body on the rim of the liquid tank. The floating body and thus also the holding element can therefore be swiveled around this swivel point (or swivel axis) relative to the lateral direction of the liquid tank.

If the holding element is not only swiveled, but instead or at the same time turned around a rotational axis of the floating body that is preferably formed rotationally symmetric around the rotational axis, a swivel point of the holding element such as this is therefore always held exactly on the rim of the liquid tank, but it also moves along with a support point of the floating body on the rim of the liquid tank according to the turning motion of the floating body of the holding element. In other words, one support point of the floating body on the rim of the liquid tank and a swivel point of the floating body (and thus also a swivel point of the holding element) are always identical.

In accordance with at least one embodiment, the liquid-based adjusting device for a solar system as described here, comprises at least one holding element for attaching at least one solar element and one swivel device, which is designed and intended for swiveling the holding element around at least one swivel axis and/or along one guiding curve of the holding element.

In this case the swivel device comprises at least one liquid tank, wherein a floating body of the holding element is at least partially arranged below a filling level of the liquid tank and only by the buoyancy thereof the holding element is swivel-mounted relative to a longitudinal axis of the liquid tank around the swivel axis and/or along the guiding curve and mounted above a filling level of the liquid tank at least indirectly on the rim of the liquid tank, wherein the filling level of the liquid tank can be varied in a predefined manner by means of a piping system of the swivel device.

In this respect, it is possible to offer a liquid-based adjusting device for a solar system in which the swivel device, that is to say swiveling itself, is performed exclusively by varying the filling level of the liquid tank as described above instead of with the help of mechanical elements and/or electromotors as known from state-of-the-art technology, in an especially simple and cost-effective way, as hinted at above.

In accordance with at least one embodiment, the guiding curve is formed completely by the rim of the liquid tank. Guiding curve and rim of the liquid tank therefore overlap completely. Thus, the rim is preferably the only element that supports the floating body and thus the holding element itself. It is therefore possible to forgo elaborate support devices. In this respect, it is possible to use the liquid tank as described here not only to swivel the filling level and thus the floating body itself, but also to use the rim of the liquid tank as described here as a support element. The swivel point of the floating body is therefore also formed by the boundary of the liquid tank, wherein of course the swivel point can also be an element of the guiding curve as described here.

In accordance with at least one embodiment, the swivel device comprises at least one, preferably at least two further liquid tanks, that are connected with the piping system in such a way, that a respective filling level in these liquid tanks can also be adjusted by means of the piping system. In each of these liquid tanks at least one lifting element is arranged in a floating manner, wherein this lifting element is connected mechanically to the holding element in one point of action via a steering rod.

Each holding element and each lifting element in particular is associated in a unique manner and preferably in a biunique manner with a point of action. The point of action is therefore the attachment point of the steering rod to the holding element itself. In this case the point of action is respectively located on a plain that is vertical to the longitudinal axis in radial direction outside of the liquid tank, in which the floating body is arranged, so that the respective point of action in an imaginary line to the swivel point forms a lever axis. The point of action in particular may not only be a point at which the holding element is pulled in longitudinal direction, but the point of action may also be an attachment point to which compressive forces can apply.

If the filling level in the further liquid tanks is raised, the corresponding lifting elements are pushed upwards by the buoyancy. This means, that compressive forces affect the point of action of the holding element via the steering rod and the holding element is pushed upwards and rotates around the rim of the liquid tank. For this, the buoyant forces of the lifting element together with the lever axis between the point of action and the swivel point have to have a bigger buoyancy torque than the floating body. Only then the holding element is pushed upwards so that an inclination of the main extension plain of the holding element is decreased relative to the longitudinal axis of the liquid tank. Thus, the angle is decreased.

As is the case for the previously mentioned liquid tanks, these further liquid tanks can each comprise at least one liquid lead in pipe and one liquid lead out respectively for adjusting the individual liquid levels in the further liquid tanks. It is possible in particular to have the individual filling levels of the additional liquid tanks be connected in a fluid-technical fluid communication through a piping system. The liquid levels can therefore be set in a fluid relation to one another either among the further liquid tanks as well as for example between the liquid tanks and all or just one of the further liquid tanks.

A rotation of the holding element around for example a symmetry axis of the floating body is then caused by for example raising the liquid level in one of the further liquid tanks and/or reducing the liquid level in a liquid tank. Due to the differently adjusting liquid levels, the lifting elements are moved in correspondingly different longitudinal directions (of the additional liquid tanks). As each point of action of the lifting elements in the plain vertical to the longitudinal axis of the liquid tanks is preferably set at distances in a predefined manner, a rotational torque is created exclusively through the movement of the lifting elements in, for example, opposing directions. This causes a rotation of the floating body and its rotational axis along the rim of the liquid tank.

In accordance with at least one embodiment the swivel device comprises at least one liquid pump by means of which the liquid level of the liquid tank and/or a liquid level of at least one of the liquid tanks can be varied via a supply or removal of liquid through a piping system. In particular, the individual filling levels of the liquid tanks can be varied independently of one another via the piping system.

A liquid pump such as this can conceivably be built in together with the liquid tank. The liquid pump could conceivably also be arranged separately from the tanks as an alternative or additionally. A liquid pump such as this could conceivably be arranged in a boiler room and be fluidly connected with at least one of the liquid tanks.

In accordance with at least one embodiment the swivel device comprises at least one control device which at least sends a pump signal to the liquid pump in dependence of the time of day and/or year. In particular, the control device can comprise at least a light- and/or moisture- and/or temperature sensor, according to which an adjusting degree of the holding element and especially of the main extension plain of the holding element via the individual liquid levels of the liquid tanks and/or the further liquid tanks for instance by programming a control device (possibly display or other input device). The usage of electromotors that are expensive and in particular liable to break down can therefore be forgone completely. As has been mentioned previously, a core element of the present invention is the fact that changes to and, for example, an inclination of the holding element and in particular its main extension plain relative to the longitudinal axis of the liquid tank is achieved exclusively by varying the liquid level.

In accordance with at least one embodiment, this liquid is water. Water has the particular advantage, that it may be used from a, for example, hot water circuit, which is already present in a preferably closed heating circuit system of a house. Implementation of a separate piping system only for varying the individual filling levels can therefore be forgone. In this respect, the piping system as described here can be part of a closed piping system and/or closed heating circuit system. It is conceivable that the liquid is mixed with an antifreeze agent to prevent the liquid from freezing during cold winter months. In addition, it is conceivable that the water ports of the piping system are connected to a hot water circuit. In this respect, freezing of the liquid during cold winter months can be prevented.

In accordance with at least one model, the floating body and/or one or each of the lifting elements is designed in the form of a hollow body, wherein at least one weight means is incorporated in the floating body and/or each lifting element. This weight means can be a massive weight element. It could also be conceivable, that this weight means is a liquid, for example again water, that is poured into the individual hollow areas. Thus, the individual weight and also the buoyancy of the floating body and/or the lifting elements can be adjusted in particular individually.

In the following, the liquid-based adjusting device for a solar system is described in more detail using an embodiment and the corresponding diagrams.

Figure 1B:
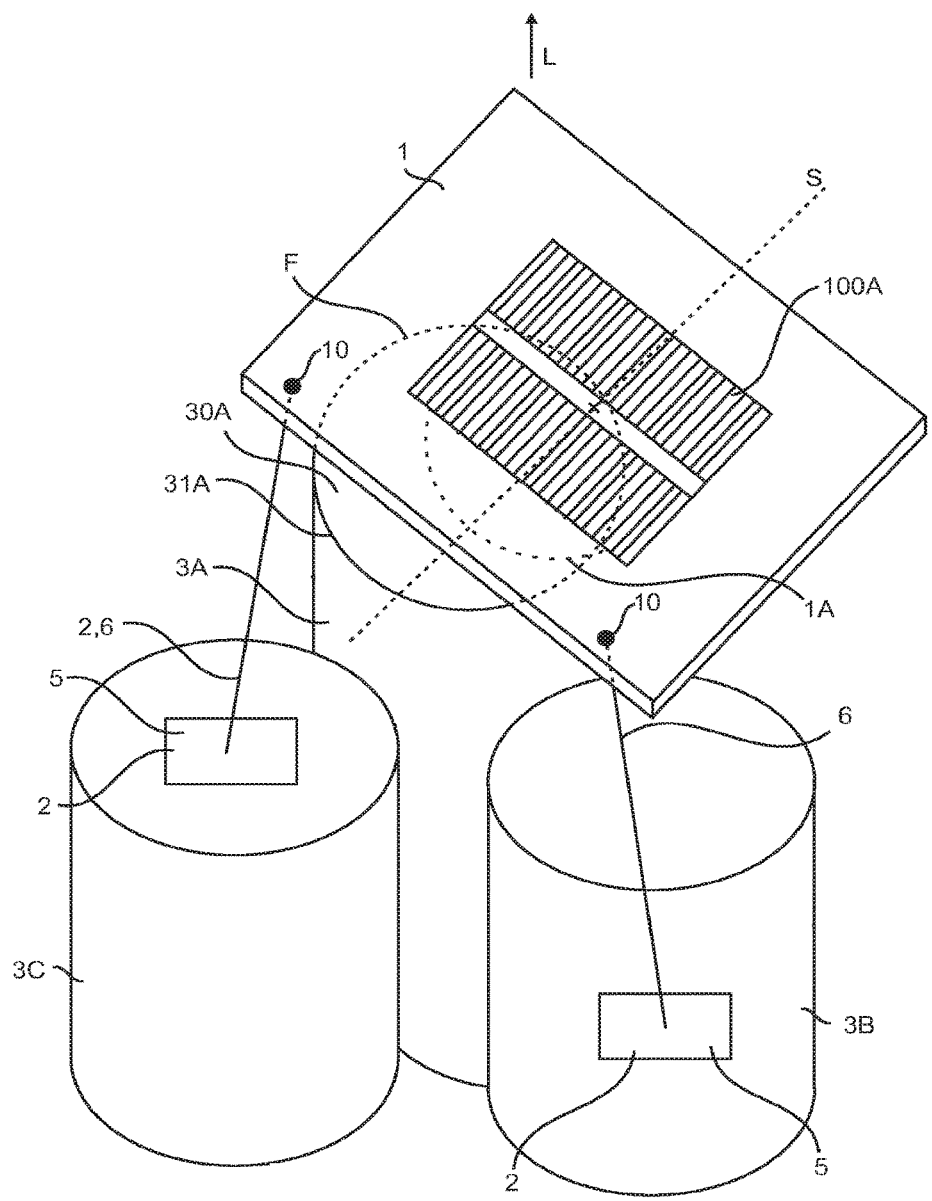
Figure 1C:
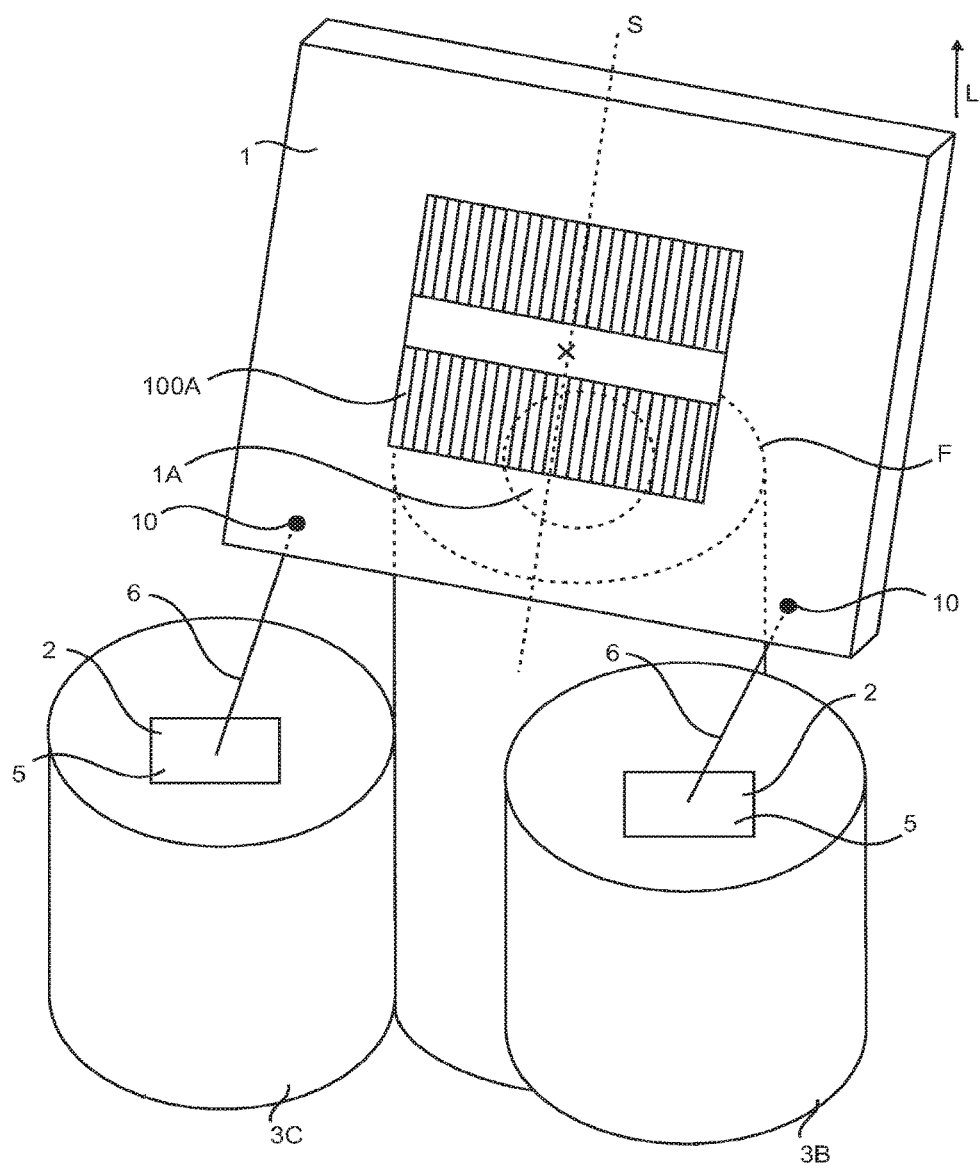

FIG. 1A-1C Schematic perspective view of an embodiment of a liquid-based solar system for a solar module as described here.

As is made evident by the figures, the size of the elements described here can be exaggerated. However, it is pointed out that components, which are the same or act in the same way, have the same reference signs.

FIG. 1A shows a schematic perspective view of an embodiment of a liquid-based adjusting device 100 for a solar system 100A. The liquid-based adjusting device 100 comprises a holding element 1 for attaching at least one solar element of solar system 100A. Holding element 1 is built as a flat surface and thus forms a mounting plain, onto which at least one solar element is mounted.

The liquid-based adjusting device 100 also comprises a swivel device 2, which is designed and intended for swiveling holding element 1 around a swivel axis S and/or along a guiding curve F of holding element 1. In particular, the main extension plain of holding element 1 takes up a defined angle to a longitudinal axis L of a liquid tank 3A of the swivel device 2. It is also apparent that holding element 1 comprises a floating body 1A, wherein an attachment plane of the holding element 1 and floating body 1A of the holding element are tightly connected mechanically. The attachment plane and the mounting plain are therefore on sides of holding element 1, which face away from each other.

Thus, a rotational axis of floating body 1A is arranged vertically on the main extension plain of the holding plain of holding element 1. In this respect, a main extension plain of the solar element is also vertical to the rotational axis of the floating body. In other words, floating body 1A of holding element 1 extends away from the mounting plain and into the opening of liquid tank 3A.

In order to prevent holding element 1 from sliding on the rim 31A of the liquid tank, the attachment plane could conceivably comprise a fixing and/or roll off device which determines and, for example, even forms guiding curve F and/or swivel axis S and/or a swivel point on the holding element 1 independent of the inclination of holding element 1 relative to the longitudinal axis L of liquid tank 3A.

Floating body 1A of holding element 1 and the solar element are therefore mounted onto different sides of holding element 1.

As is clearly visible in FIG. 1A, floating body 1A is arranged partially below a filling level 30A of liquid tank 3A, with floating body 1A of holding element 1 being able to be swiveled around swivel axis S and/or along guiding curve F only by the buoyancy thereof relative to longitudinal axis L of liquid tank 3A and also sticking out at least partially above filling level 30A. Floating body 1A of holding element 1 rests exclusively on a rim 31A of liquid tank 3A, wherein floating body 1A can be rotated or swiveled along rim 31A and at the same time swiveled around a swivel point of the rim of liquid tank 3A. Rim 31A of liquid tank 3A thus not only acts as a swivel point of floating body 1A and therefore of the entire holding element 1, but can also be formed as the single supporting element of the entire holding element 1.

It is also apparent that filling level 30A of liquid tank 3A can be varied in a predefined manner by means of a piping system 4 of the swivel device 2.

It is particularly evident that piping system 4 comprises a liquid lead-in 4A and a liquid lead-out 4B, which directly lead into a lateral surface of liquid tank 3A. Filling level 30A of liquid tank 3A can thus be varied directly and particularly easily by means of liquid lead-in 4A or liquid lead-out 4B.

In addition, swivel device 2 comprises two further liquid tanks 3B and 3C which are spaced from one another on a plane which is vertical to a longitudinal axis L of liquid tank 3A. These tanks are also connected with the above described piping system 4 in such a way that their filling levels can be adjusted particularly easily, in dependence of or independently from each other, by means of piping system 4.

Each further liquid tank 3B, 3C is assigned at least one lifting element 5, wherein this lifting element 5 is arranged in a floating manner in liquid tanks 3B, 3C at least partially below a respective filling level. Each lifting element 5 is connected mechanically to holding element 1 at a point of action 10 through a steering rod 6, which is associated with this lifting element 5 in a unique and preferably biunique manner. Point of action 10 is formed in the mounting plain of holding element 1, so that point of action 10 forms a swivel lever relative to the swivel point (formed by rim 31A of liquid tank 3A), which counteracts a leverage force by the buoyancy of floating body 1A.

By a variation of the filling level in the individual further liquid tanks 3B and 3C, the lifting element can thus be adjusted in lateral direction L, whereby an inclination of holding element 1 and particularly of each solar element relative to longitudinal axis L of the liquid tank can also be adjusted through the steering rod 6 meshing with point of action 10. Holding element 1 then starts rotating around a rotational axis and/or symmetry axis of floating body 1A.

It is evident that the individual filling levels can either be varied independently of each other through the piping system 4 described here and are fluid-technically connected to it or that the individual filling levels of each of the liquid tanks 3A, 3B and 3C or, for example, just two of the liquid tanks are fluid-technically in fluid communication with one another.

In addition, swivel device 2 comprises a liquid pump 7, with which the liquid levels in liquid tanks 3A, 3B and 3C can be varied via a supply and removal of liquid through piping system 4. In particular, a supply and removal of liquid of this type can be identical to a supply and removal of fluids, as described above.

The swivel device 2, as described here, also comprises a control device 8, which at least sends one pump signal to liquid pump 7 in dependence of the time of day and/or year and/or the outside temperatures. In this respect, it is particularly easy to adjust the solar element relative to longitudinal axis L of liquid tank 3A. In this respect, swivel device 2 and in particular control device 8 as described here can be in such a way that a maximum area of the solar element can be illuminated by the sun or a maximum area is directly exposed to the sun respectively. The efficiency can therefore be maximized.

Furthermore, the swivel device, as described here, is in fluid communication with at least one hot water connection 9. Therefore, water connection 9 prevents for example the water in the liquid tanks from freezing at low temperatures. In particular, the hot water connection 9, as described here, can also be used for defrosting the liquid.

FIGS. 1B and 1C show another schematic perspective view of the model shown in FIG. 1C.

The invention is not restricted by the description based on the embodiment and the diagram. The invention rather comprises each new feature, as well as each combination of features, which particularly includes each combination of features in the patent claims, even if this feature or this combination is not explicitly mentioned in the patent claims or the embodiments.

REFERENCE LIST

1 holding element
1A floating body
2 swivel device
3A liquid tank
3B, 3C additional liquid tanks
4 piping system
4A liquid lead-in
4B liquid lead-out
5 lifting element
6 steering rod
7 liquid pump
8 control device
9 hot water connection
10 point of action
30A filling level
31A rim
100 adjusting device
100A solar system
S swivel axis
F guiding curve
L longitudinal axis/lateral direction

The invention claimed is:

1. Liquid-based adjusting device (100) for a solar system, comprising:
   a. at least one holding element (1) for attaching at least one solar element,
   b. a swivel device (2) which is designed and intended for swiveling the holding element (1) around at least one swivel axis (S) and/or along a guiding curve (F) completely formed by a boundary of at least one liquid tank (3A), of the holding element (1), characterized in that the swivel device (2) comprises at least the one liquid tank (3A), wherein one floating body (1A) of the holding element (1) is at least partially arranged below a filling level (30A) of the liquid tank (3A) and only by the buoyancy thereof the holding element (1) is swivel-mounted relative to a longitudinal axis (L) of the liquid tank (3A) around the swivel axis (S) and/or along the guiding curve (F) and is mounted above the filling level (30A), at least indirectly on a rim (31A) of the liquid tank (3A), and wherein the filling level (30A) of the liquid tank (3A) can be varied in a predefined manner by means of a piping system (4) of the swivel device (2).

2. Adjusting system (100) according to claim 1, characterized in that the swivel device (2) comprises at least one, preferably at least two, further liquid tanks (3B, 3C) which are connected to the piping system (4) in such a way, that a respective filling level (30A) can be adjusted also in these liquid tanks (3B, 3C) by means of the piping system (4), and
   at least one lifting element (5) is arranged in each liquid tank (3A, 3B, 3C) in a floating manner, wherein this lifting element (5) is mechanically connected to the holding element (1) at a point of action (10) by means of a steering rod (6).

3. Adjusting system (100) according to claim 1, characterized in that the individual filling levels (30A) of the liquid tanks (3A, 3B, 3C) can be varied independently of each other by the piping system (4).

4. Adjusting system (100) according to claim 1, characterized in that the swivel device (2) comprises at least one liquid pump (7) by means of which the filling level (30A) of the liquid tank (3A) can be varied via a supply and/or a removal of liquid through the piping system (4).

5. Adjusting system (100) according to claim 1, characterized in that the swivel device (2) comprises at least one control device (8) which sends at least one pump signal to the liquid pump (7) independence of the time of day and/or year.

6. Adjusting system (100) according to claim 1, characterized in that the liquid is water.

7. Adjusting system (100) according to claim 1, characterized in that the liquid is at least mixed with one antifreeze agent.

8. Adjusting system (100) according to claim 1, characterized in that the liquid tank (3A) is made out of plastic.

9. Adjusting system (100) according to claim 1, characterized in that the piping system (4) is a closed piping system and/or part of a heating circuit system.

10. Adjusting system (100) according to claim 1, characterized in that the swivel device (2) comprises at least one hot water connection (9).

11. Adjusting system (100) according to claim 1, characterized in that the floating body (1A) and/or one each of the lifting elements (5) is designed in the form of a hollow body, wherein at least one weight means is incorporated in the floating body and/or in each of the lifting elements (5).

* * * * *